(12) United States Patent
Sato et al.

(10) Patent No.: US 7,820,914 B2
(45) Date of Patent: Oct. 26, 2010

(54) INSULATED WIRE AND A WIRING HARNESS

(75) Inventors: Masashi Sato, Yokkaichi (JP); Masato Inoue, Yokkaichi (JP); Tsuyoshi Nonaka, Yokkaichi (JP); Yasuyuki Otsuka, Yokkaichi (JP); Naoaki Sawamura, Yokkaichi (JP); Tetsuya Iwasaki, Yokkaichi (JP); Yoshiharu Deguchi, Yokkaichi (JP); Yukihiro Sakamoto, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 12/310,196

(22) PCT Filed: Aug. 22, 2007

(86) PCT No.: PCT/JP2007/066281

§ 371 (c)(1),
(2), (4) Date: Mar. 6, 2009

(87) PCT Pub. No.: WO2008/026487

PCT Pub. Date: Mar. 6, 2008

(65) Prior Publication Data

US 2009/0255708 A1    Oct. 15, 2009

(30) Foreign Application Priority Data

Sep. 1, 2006    (JP)    ............................ 2006-237439

(51) Int. Cl.
*H01B 3/44*    (2006.01)
(52) U.S. Cl. .................................. 174/110 R
(58) Field of Classification Search ............. 174/110 R, 174/110 SR
See application file for complete search history.

(56) References Cited

U.S. PATENT DOCUMENTS

| 6,894,227 | B2 | 5/2005 | Kanamori et al. |
| 7,371,790 | B2 | 5/2008 | Yoshida et al. |
| 2004/0102551 | A1 | 5/2004 | Sato et al. |
| 2005/0154100 | A1 | 7/2005 | Kosaka et al. |

FOREIGN PATENT DOCUMENTS

| CN | 1125741 A | 7/1996 |
| CN | 1511179 A | 7/2004 |
| CN | 1561371 A | 1/2005 |
| EP | 0 704 478 A1 | 4/1996 |
| JP | A-07-176219 | 7/1995 |
| JP | A-2006-225492 | 8/2006 |
| WO | WO 2004/046246 A1 | 6/2004 |
| WO | WO 2005/068549 A1 | 7/2005 |

OTHER PUBLICATIONS

Jul. 28, 2010 Chinese Office Action with English-language Translation.

*Primary Examiner*—Chau N Nguyen
(74) *Attorney, Agent, or Firm*—Oliff & Berridge, PLC

(57) ABSTRACT

An insulated wire possessing preferable flame retardancy, water resistance and wear resistance. The insulated wire including an insulator layer made from a composition including 96 to 44 parts by weight of (A) a polyester type resin, 4 to 56 parts by weight of (B) a polyphenylene ether type resin, 1 to 70 parts by weight of (C) one or more than one sort of polymer selected from the group consisting of a styrene type polymer, an olefin type polymer including a functional group, and a polymer including an ester group with respect to 100 parts by weight of (A) the polyester type resin and (B) the polyphenylene ether type resin, and 1 to 50 parts by weight of (D) a phosphoester compound with respect to 100 parts by weight of (A) the polyester type resin and (B) the polyphenylene ether type resin.

5 Claims, No Drawings

INSULATED WIRE AND A WIRING HARNESS

TECHNICAL FIELD

The present invention relates to an insulated wire and a wiring harness.

BACKGROUND ART

Conventionally, for an insulated wire used in carrying out wiring of parts for a car and electric/electronic equipment, there is widespread use of an insulated wire in which a vinyl chloride resin composition to which a halogenous flame retardant is added is arranged to cover a conductor.

However, there is a problem that the insulated wire includes halogen elements, so that it emits harmful halogenous gas into the atmosphere in case of car fire or at the time of combustion for disposing of electric/electronic equipment by incineration, causing environmental pollution.

Therefore, from the view point of reducing loads on the global environment, a material for an insulator layer has been recently changed from the vinyl chloride resin composition to a polyolefin type resin composition which is prepared by adding a metallic hydrate such as a magnesium hydroxide to polyolefin such as polyethylene.

As an example of the polyolefin type resin composition, please refer to Japanese Patent Application Unexamined Publication No. Hei07-176219 which discloses an insulated wire including a composition as a material for an insulator layer, the composition containing 30 to 100 parts by weight of magnesium hydroxide with respect to 100 parts by weight of a blend polymer of straight-chain polyethylene and carboxylic acid denatured polyethylene.

DISCLOSURE OF THE INVENTION

Problems to be Solved by the Invention

The insulated wire including the polyolefin type resin composition is excellent in water resistance which is one of important properties of the wire because a base of the polyolefin type resin composition is polyolefin which shows almost no water-absorbing property nor hydrolyzability.

However, the polyolefin type resin composition usually requires a large amount of flame retardant (e.g., magnesium hydrate) to be added thereto in order to secure sufficient flame retardancy, thus bringing a disadvantage that mechanical properties such as wear resistance remarkably degrade. The disadvantage becomes greater especially in the case of a thin-walled insulated wire in which higher wear resistance is required of an insulator layer.

Thus, it is difficult to obtain an insulated wire which possesses preferable flame retardancy, water resistance and wear resistance only by improvement of a material for an insulator layer, i.e., only by changing the material to a polyolefin type resin composition.

The present invention has been made in view of the problems described above, and an object of the present invention is to overcome the problems and to provide an insulated wire which possesses preferable flame retardancy, water resistance and wear resistance by including a composition as a material for an insulator layer, which is systematically different from a polyolefin type resin composition.

Means to Solve the Problem

To achieve the objects and in accordance with the purpose of the present invention, an insulated wire according to a preferred embodiment of the present invention includes an insulator layer made from a composition including 96 to 44 parts by weight of (A) a polyester type resin, 4 to 56 parts by weight of (B) a polyphenylene ether type resin, 1 to 70 parts by weight of (C) one or more than one sort of polymer selected from the group consisting of a styrene type polymer, an olefin type polymer including a functional group and a polymer including an ester group with respect to 100 parts by weight of (A) the polyester type resin and (B) the polyphenylene ether type resin, and 1 to 50 parts by weight of (D) a phosphoester compound with respect to 100 parts by weight of (A) the polyester type resin and (B) the polyphenylene ether type resin.

In this case, it is preferable that, in the insulated wire, the concentration of a carboxyl group which is contained in an ingredient dissolved in hexafluoroisopropanol is below 60 $eq/10^6$ g, the ingredient being obtained by subjecting the insulator layer to frost shattering and to acetone extraction, subjecting the residue from the acetone extraction to toluene elution and removing an ingredient which is easily eluted with toluene therefrom, and dissolving the residue from the toluene elution in the hexafluoroisopropanol.

It is also preferable that the insulator layer is in the outermost layer.

It is also preferable that the insulator layer has a thickness of less than 0.4 mm.

Meanwhile, a wiring harness according to the present invention includes the insulated wire.

Effects of the Invention

Having the insulator layer which is made from the specific composition, the insulated wire according to the present invention possesses preferable flame retardancy, water resistance and wear resistance.

If the concentration of the carboxyl group as specified above is below 60 $eq/10^6$ g, the insulator layer is hard to be hydrolyzed, which accordingly develops high water resistance even in an environment such that heat is applied thereto.

If the insulator layer made from the specific composition is in the outermost layer, excellent flame retardancy, water resistance and wear resistance are easily delivered.

Even if the insulator layer is thin having the thickness of less than 0.4 mm, excellent wear resistance can be delivered, so that the insulated wire is hard to be scratched.

Meanwhile, since the wiring harness according to the present invention includes the insulated wire, advantageous properties such as scratch resistance are displayed even when the insulator layer in the insulated wire is scratched by a terminal or other elements in routing the insulated wire during production of the harness. In addition, an advantage of easily ensuring high reliability over a long period of time in using the harness is shown since the insulated wire is hard to be worn out. In addition, an advantage of easily narrowing a diameter of the wire harness is shown since the insulator layer in the insulated wire is easily thinned.

BEST MODE FOR CARRYING OUT THE INVENTION

A detailed description of a preferred embodiment of the present invention will now be provided. Hereinafter, in the description, an insulated wire according to the preferred embodiment of the present invention is sometimes referred to as the "present wire" and a wiring harness according to the preferred embodiment of the present invention is sometimes referred to as the "present wiring harness".

1. Insulated Wire

The present wire includes an insulator layer made from a specific composition (hereinafter, the insulator layer is sometimes referred to as the "specific insulator layer") as a covering material.

1.1 Layer Structure of Covering Material

The insulator layer included in the present wire may be formed of one layer, or two or more layers. When the insulator layer is formed of one layer, this layer defines the specific insulator layer. When the insulator layer is formed of two or more layers, any layer among them may define the specific insulator layer. However, in view of easy thinning of the insulator layer, the insulator layer is preferably formed of one layer.

Specific configurations of the present wire include a configuration such that the specific insulator layer of one layer is covered directly around a conductor, and a configuration such that an insulator layer of one or more than one layer (e.g., the specific insulator layer, an additional insulator layer, a combination thereof) is covered around a conductor and then the specific insulator layer is covered around it.

It is preferable that the specific insulator layer is placed in the outer most layer. This is because if placed at a surface position which is susceptible to external circumstances such as fire (heat), water and sliding, the insulator layer easily produces its effect.

An upper limit of the thickness of the specific insulator layer is preferably 0.4 mm, 0.35 mm, 0.3 mm, 0.25 mm or 0.2 mm considering that flexibility, tractability and other properties of the specific insulator layer are preferable. Meanwhile, a lower limit of the thickness of the specific insulator layer, which can be combined with the upper limit, is preferably 0.06 mm, 0.08 mm and 0.1 mm.

1.2 Conductor

For the conductor, a single wire, a stranded wire which is made by stranding a plurality of wires, and a compressed stranded wire are preferably used. The conductor is made from a metal (including an alloy) such as copper, a copper base alloy, aluminum, an aluminum base alloy and a stainless steel. When the conductor is a stranded wire, the wires making up the stranded wire may be made from an identical material, or two or more than two different materials combined. The diameter of the conductor is not specifically limited and can be selected appropriately as usage.

1.3 Specific Composition

The above-described specific composition contains (A), (B), (C), (D) ingredients to be described below as essential ingredients. Hereinafter, detailed descriptions thereof will be provided.

<(A) Ingredient>

The (A) ingredient is a polyester type resin. For the polyester type resin, any type of polyester type resin can be used if it is thermoplastic.

Specific examples of the polyester type resin include a polybutylene terephthalate type resin, a polyethylene terephthalate type resin, a polybutylene naphthalate type resin, a polyethylene naphthalate type resin, and a poly-1,4-cyclohexane dimethylene terephthalate type resin. They may be used by one sort alone or more than one sort in combination. Among them, the polybutylene terephthalate type resin is preferably used in view of improvement of extrusion moldability.

The polybutylene terephthalate type resin mainly includes a dicarboxylic acid unit which consists principally of a terephthalic acid unit, and a diol unit which consists principally of a 1,4-butanediol unit. Representative examples thereof include polybutylene terephthalate which consists of a terephthalic acid unit and a 1,4-butanediol unit, and the polybutylene terephthalate is preferably used in the present invention.

The above-described polybutylene terephthalate type resin is not limited to polybutylene terephthalate, and it may include an additional dicarboxylic acid unit and/or an additional diol unit as necessary.

For the additional dicarboxylic acid unit, an aromatic dicarboxylic acid such as an isophthalic acid, a phthalic acid, a 2,6-naphthalene dicarboxylic acid, a 1,5-naphthalene dicarboxylic acid, bis(p-carboxy-phenyl)methane, an anthracene dicarboxylic acid, a 4,4'-diphenyl ether dicarboxylic acid and a sodium 5-sulfoisophthalic acid, an aliphatic dicarboxylic acid such as an adipic acid, a sebacic acid, an azelaic acid and a dodecanedioic acid, an alicyclic dicarboxylic acid such as a 1,3-cyclohexane dicarboxylic acid and a 1,4-cyclohexane dicarboxylic acid, and dicarboxylic acid units which are derivatized from ester-forming derivatives (e.g., a lower alkyl ester such as a methyl ester and an ethyl ester) of the above-described dicarboxylic acids are preferably used. They may be used by one sort alone or more than one sort in combination.

Meanwhile, for the additional diol unit, an aliphatic diol with carbon number from 2 to 10 such as an ethylene glycol, a propylene glycol, a neopentyl glycol, a 2-methyl propane diol, a 1,5-pentane diol, a cyclohexane dimethanol and a cyclohexane diol, and a diol unit which is derivatized from a polyalkylene glycol such as a diethylene glycol, a polyethylene glycol, a poly-1,3-propylene glycol and a polytetramethylene glycol are preferably used. They may be used by one sort alone or more than one sort in combination.

The polyester type resin is contained in the range of 96 to 44 parts by weight. If the polyester type resin is contained more than 96 parts by weight, tendencies such as to degrade flame retardancy are shown, and if the polyester type resin is contained less than 44 parts by weight, tendencies such as to degrade wear resistance are shown.

It is preferable for the polyester type resin to be contained in the range of 95 to 50 parts by weight, and more preferable to be contained in the range of 95 to 60 parts by weight.

<(B) Ingredient>

The (B) ingredient is a polyphenylene ether type resin. For the polyphenylene ether type resin, polymers of phenols which are expressed by chemical structural formula 1 shown below are preferably used.

In the chemical structural formula 1, $R_1$ to $R_4$ may be any of a hydrogen atom, an alkoxyl group (e.g., a methoxy group, an ethoxy group, a propyloxy group, an isopropyloxy group, a butoxy group, a tert-butoxy group, a phenoxy group, a benzyloxy group), and a hydrocarbon group which may have a substituent (e.g., a methyl group, an ethyl group, an n-propyl group, an isopropyl group, an n-butyl group, a sec-butyl group, an n-amyl group, an isoamyl group, a 1-ethylpropyl group, a 2-methylbutyl group, an n-hexyl group, a 2,3-dimethylbutyl group, a 2,3-or 4-methylpentyl group, a heptyl group, a hydroxyethyl group, a phenylethyl group, a benzyl group, a hydroxymethyl group, a carboxyethyl group, a methoxycarbonylethyl group, a cyanoethyl group, a phenyl group, a methylphenyl group, a dimethylphenyl group, an ethylphenyl group, an aminoethyl group, an aminomethyl group). Two or more than two of $R_1$ to $R_4$ may be the same one.

[Chemical structural formula 1]

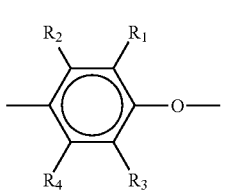

The polymers of phenols for the polyphenylene ether type resin may be prepared by homopolymerizing phenols of the same sort, or may be prepared by copolymerizing phenols of different sorts. They may be used by one sort alone or more than one sort in combination.

The above-described polyphenylene ether type resin is preferably a homopolymer of a 2,6-dimethyl-1,4-phenyleneether, and a copolymer of a 2,6-dimethylphenol and a 2,3,6-trimethylphenol.

The above-described polyphenylene ether type resin may be a modified polyphenylene ether type resin into which one or more than one sort of functional group such as a carboxylic acid group, an acid anhydrous group, an epoxy group and a silane group are introduced by means of a graft method or a direct (copolymerization) method.

For a compound for introducing the carboxylic acid group or the acid anhydrous group, an alpha, beta-unsaturated dicarboxylic acid such as a maleic acid, a fumaric acid, a citraconic acid and an itaconic acid, anhydrides thereof, and an unsaturated monocarboxylic acid such as an acrylic acid, a methacrylic acid, a furan acid, a crotonic acid, a vinylacetic acid and a pentane acid are preferably used. They may be used by one sort alone or more than one sort in combination. Among them, the maleic acid, the fumaric acid, the itaconic acid and the maleic acid anhydride are more preferably used.

For a compound for introducing the epoxy group, glycidyl acrylate, glycidyl methacrylate, an itaconic acid monoglycidyl ester, a butene tricarboxylic acid monoglycidyl ester, a butene tricarboxylic acid diglycidyl ester, a butene tricarboxylic acid triglycidyl ester, glycidyl esters such as an alpha-chloroacrylic acid, a maleic acid, a crotonic acid and a fumaric acid, glycidyl ethers such as a vinyl glycidyl ether, an allyl glycidyl ether, a glycidyl oxyethyl vinyl ether and a styrene-p-glycidyl ether, and p-glycidyl styrene are preferably used. They may be used by one sort alone or more than one sort in combination.

For a compound for introducing the silane group, an unsaturated silane compound such as vinyltrimethoxy silane, vinyltriethoxy silane, vinyltriacetyl silane and vinyltrichloro silane are preferably used. They may be used by one sort alone or more than one sort in combination.

In addition, the polyphenylene ether type resin may be used as it is without modification in the form of powder through a polymerization process, or may be used by being blended with one or more than one sort of styrene type resin such as polystyrene (PS), high-impact polystyrene (HIPS), an acrylonitrile-styrene copolymer (AS), an acrylonitrile-butadiene-styrene copolymer (ABS) and a methyl methacrylate-butadiene-styrene copolymer, a propylene type resin such as polypropylene, and a polyamide type resin in view of improvement of extrusion moldability. In this case, it is preferable that the polyphenylene ether type resin is contained 40 wt % or more in the blended polymer.

The polyphenylene ether type resin is contained in the range of 4 to 56 parts by weight. If the polyphenylene ether type resin is contained more than 56 parts by weight, tendencies such as to degrade wear resistance are shown, and if the polyphenylene ether type resin is contained less than 4 parts by weight, tendencies such as to degrade flame retardancy are shown.

It is preferable for the polyphenylene ether type resin to be contained in the range of 5 to 50 parts by weight, and more preferable to be contained in the range of 5 to 40 parts by weight.

<(C) Ingredient>

The (C) ingredient is one or more than one sort of polymer selected from the group consisting of a styrene type polymer, an olefin type polymer including a functional group, and a polymer including an ester group.

For the styrene type polymer, a styrene type resin such as polystyrene (PS), high-impact polystyrene (HIPS), an acrylonitrile-styrene copolymer (AS), an acrylonitrile-butadiene-styrene copolymer (ABS) and a methyl methacrylate-butadiene-styrene copolymer, a styrene-ethylene/butylene-styrene block polymer (SEBS), a styrene-ethylene/propylene-styrene block copolymer (SEPS), styrene type thermoplastic elastomers made of the above-described polymers by being hydrogenerated, and the above-described styrene type resins and the above-described styrene type thermoplastic elastomers into which a functional group such as a carboxylic acid group, an acid anhydrous group, an epoxy group, a silane group and an oxazoline group is introduced by means of a graft method or a direct (copolymerization) method are preferably used. They may be used by one sort alone or more than one sort in combination.

For a compound for introducing the carboxylic acid group or the acid anhydrous group, an alpha, beta-unsaturated dicarboxylic acid such as a maleic acid, a fumaric acid, a citraconic acid and an itaconic acid, anhydrides thereof, and an unsaturated monocarboxylic acid such as an acrylic acid, a methacrylic acid, a furan acid, a crotonic acid, a vinylacetic acid and a pentane acid are preferably used. They may be used by one sort alone or more than one sort in combination. Among them, the maleic acid and the maleic acid anhydride are preferably used.

For a compound for introducing the epoxy group, glycidyl acrylate, glycidyl methacrylate, an itaconic acid monoglycidyl ester, a butene tricarboxylic acid monoglycidyl ester, a butene tricarboxylic acid diglycidyl ester, a butene tricarboxylic acid triglycidyl ester, glycidyl esters such as an alpha-chloroacrylic acid, a maleic acid, a crotonic acid and a fumaric acid, glycidyl ethers such as a vinyl glycidyl ether, an allyl glycidyl ether, a glycidyl oxyethyl vinyl ether and a styrene-p-glycidyl ether, and p-glycidyl styrene are preferably used. They may be used by one sort alone or more than one sort in combination.

For a compound for introducing the silane group, an unsaturated silane compound such as vinyltrimethoxy silane, vinyltriethoxy silane, vinyltriacetyl silane, and vinyltrichloro silane is preferably used. They may be used by one sort alone or more than one sort in combination.

For the olefin type polymer including a functional group, polyethylene (e.g., high-density polyethylene (HDPE), medium-density polyethylene (MDPE), low-density polyethylene (LDPE), linear low-density polyethylene (LLDPE), very low-density polyethylene (VLDPE)), polypropylene (a homopolymer, a random polymer, a block polymer), polybutene, olefin type polymers such as an alpha-olefin copolymer (e.g., an ethylene-vinyl acetate copolymer (EVA), an ethylene-methylacrylate copolymer (EMA), an ethylene-ethylacrylate copolymer (EEA), an ethylene-butylacrylate copolymer (EBA), an ethylene-methylmethacrylate copolymer (EMMA)), into which a functional group such as a carboxylic acid group, an acid anhydrous group, an epoxy group and a silane group as described above is introduced by means of a graft method or a direct (copolymerization) method, an ethylene glycidyl methacrylate copolymer (EGMA), and graft copolymers in which olefin type polymers including a functional group as described above are included as main chains and vinyl type polymers such as styrene type resins as described above are grafted as side chains are preferably used. They may be used by one sort alone or more than one sort in combination.

For the polymer including an ester group, graft copolymers in which polyester type thermoplastic elastomers or polycarbonate type resins are included as main chains and vinyl type polymers such as styrene type resins as described above are grafted as side chains are preferably used. They may be used by one sort alone or more than one sort in combination.

(C) the polymer is contained in the range of 1 to 70 parts by weight with respect to 100 parts by weight of (A) the polyester type resin and (B) the polyphenylene ether type resin. If (C) the polymer is contained more than 70 parts by weight, tendencies such as to degrade wear resistance are shown, and if (C) the polymer is contained less than 1 part by weight, (A) the polyester type resin and (B) the polyphenylene ether type resin are hard to be mixed and tendencies such as to degrade water resistance are shown.

It is preferable for (C) the polymer to be contained in the range of 3 to 60 parts by weight, and more preferable to be contained in the range of 3 to 50 parts by weight.

<(D) Ingredient>

The (D) ingredient is a phosphoester compound. For the phosphoester compound, an aromatic phosphoester containing no halogen such as a trimethyl phosphate, a triethyl phosphate, a triphenyl phosphate, a tricresyl phosphate, a trixylenyl phosphate, a cresyl diphenyl phosphate and a cresyl di 2,6-xylenyl phosphate, and a condensed aromatic phosphoester containing no halogen such as a 1,3-phenylenebis (a diphenyl phosphate), a bisphenol A bis(a diphenyl phosphate), a 1,3-phenylenebis (a di 2,6-xylenyl phosphate) and a 1,4-phenylenebis (a di 2,6-xylenyl phosphate) are preferably used. They may be used by one sort alone or more than one sort in combination.

The phosphoester compound is contained in the range of 1 to 50 parts by weight with respect to 100 parts by weight of (A) the polyester type resin and (B) the polyphenylene ether type resin. If the phosphoester compound is contained more than 50 parts by weight, tendencies such as to degrade wear resistance are shown, and if the phosphoester compound is contained less than 1 part by weight, tendencies such as to degrade flame retardancy are shown.

It is preferable for the phosphoester compound to be contained in the range of 2 to 40 parts by weight, and more preferable to be contained in the range of 3 to 30 parts by weight.

<Optional Ingredient>

As described above, the specific composition contains the (A), (B), (C), (D) ingredients as essential ingredients; however, the specific composition may further contain an optional ingredient as necessary.

For the optional ingredient, a compounding agent which is used as an additive for plastic/rubber such as an antioxidant (e.g., a phenolic antioxidant, a sulfurous antioxidant, a phosphorous antioxidant, a light stabilizer, a metal deactivator (e.g., a copper inhibitor), a lubricant (e.g., a fatty acid-based lubricant, a fatty acid amide-based lubricant, a metal soap-based lubricant, a hydrocarbon-based (wax type) lubricant, an ester-based lubricant, a silicon-based lubricant), a nucleating agent, an antistatic agent, a coloring agent, a flame-retardant auxiliary agent (e.g., a silicon-based flame-retardant auxiliary agent, a nitrogen-based flame-retardant auxiliary agent, a zinc borate flame-retardant auxiliary agent), a coupling agent (e.g., a silane-based coupling agent, a titanate-based coupling agent), a softener (e.g., a processed oil), a zinc compound (e.g., zinc oxide, zinc sulfide), a strengthening agent (e.g., glass fiber, wallastonite) and a filler (e.g., calcium carbonate) are preferably used. The optional ingredient can be contained appropriately within the ranges of not departing from the gist of the present invention, and may be used by one sort alone or more than one sort in combination.

1.4 Concentration of Carboxyl Group

In the present wire, the specific insulator layer which is subjected to frost shattering is subjected to acetone extraction, and the residue from the acetone extraction is subjected to toluene elution and an ingredient which is easily eluted with toluene is removed therefrom. The residue from the toluene elution is dissolved in hexafluoroisopropanol. It is preferable if the concentration of a carboxyl group which is contained in the dissolved ingredient is below 60 eq/$10^6$ g, more preferable if it is below 50 eq/$10^6$ g, and still more preferable if it is below 40 eq/$10^6$ g.

This is because if the concentration of the carboxyl group is within these ranges, the specific insulator layer is hard to be hydrolyzed, and high water resistance is easily delivered even when the present wire is exposed in an environment where heat in addition to water is applied thereto.

Besides, a lower limit of the concentration of the carboxyl group is not defined in particular. This is because if the concentration is lower, the carboxyl group is more advantageous in view of water resistance.

In addition, the concentration of the carboxyl group can be calculated by dissolving the dissolved ingredient in an appropriate organic solvent, and subjecting it to acid-alkali titration using an alkali hydroxide solution.

Whether the carboxyl group is contained or not can be known by an analytical method such as IR.

2. Production Process of Present Wire

A production process of the present wire is described below. Hereinafter, a configuration of the present wire such that the specific insulator layer of one layer is covered directly around the conductor will be described as an example.

Firstly, pellets of the above-described composition is prepared by mixing the required amounts of the essential ingredients, the optional ingredient and an additive appropriately, and dry-blending them preferably with the use of a regular tumbler, or kneading them preferably with the use of a regular kneader such as a Banbury mixer, a pressure kneader, a kneading extruder, a twin-screw extruder and a roll. In the kneading, the ingredients may be mixed at once, or some of the ingredients may be added in midstream preferably from an intermediate feeder. For example, it is preferable to perform the kneading in a step-by-step manner such that pellets are first prepared by kneading the (B), (C) and (D) ingredients and then the (A) ingredient is added to the pellets. It is also preferable to perform the kneading in a step-by-step manner such that pellets are first prepared by kneading the (B) and (C) ingredients and then the (A) and (D) ingredients are added to the pellets, to perform the kneading in a step-by-step manner such that pellets are first prepared by kneading the (A) and (C) ingredients and then the (B) and (D) ingredients are added to the pellets, or to perform the kneading in a step-by-step manner such that pellets are first prepared by kneading the (B) ingredient, a part of the (C) ingredient, and the (D) ingredient and then the (A) ingredient and the remaining part of the (C) ingredient are added to the pellets.

Then, the obtained pellets are dried as necessary and the composition is then covered in a predetermined thickness around the conductor with the use of an extrusion molding machine, whereby the present wire which includes the specific insulator layer can be produced.

In a case where the insulator layer is formed of two or more layers, it is essential only that ingredients to form the layers should be extrusion-covered so that the layers are in the desired order in the above-described manner.

3. Wiring Harness

The present wiring harness includes the present wire. To be more specific, the present wiring harness is prepared by covering a wire bundle including at least the present wire with a wiring-harness protective material.

The wiring-harness protective material is used for covering the wire bundle to protect from an external environment.

For a base material of the wiring-harness protective material, a non-halogenous resin composition and a vinyl chloride resin composition are preferably used.

For the non-halogenous resin composition, polyolefin flame-retardant resin compositions which are prepared by adding a non-halogenous flame retardant such as a metallic hydrate (e.g., a magnesium hydroxide) and various additives to polyolefins such as polyethylene, polypropylene and a propylene-ethylene copolymer are preferably used.

The wiring-harness protective material is formed so as to have its base material tape-shaped and at least one side of the base material applied with an adhesive, or so as to have its base material tube-shaped or sheet-shaped. The shape can be selected appropriately as usage.

EXAMPLE

A description of the present invention will now be provided specifically with reference to Examples; however, the present invention is not limited hereto.

Test Material

Test materials used in the present Examples are as follows.

(A) Ingredient

Polybutylene terephthalate <1> (PBT<1>) [manuf.: Win-Tech Polymer Ltd., trade name: "DURANEX2000"]

Polybutylene terephthalate <2> (PBT<2>) [manuf.: Toray Industries Inc., trade name: "TORAYCON 1401×06"]

Polybutylene terephthalate <3> (PBT<3>) [manuf.: Mitsubishi Engineering-Plastics Corporation, trade name: "NOVADURAN5010R5"]

Polybutylene terephthalate <4> (PBT<4>) [manuf.: GE Plastics Japan Ltd., trade name: "Valox310"]

Polyethylene terephthalate (PET) [manuf.: TOYOBO CO., LTD., trade name: "PETMAX RN203"]

(B) Ingredient

Polyphenylene ether type resin <1> (PPE<1>) [manuf.: Mitsubishi Engineering-Plastics Corporation, trade name: "Iupiace AH70"]

Polyphenylene ether type resin <2> (PPE<2>) [manuf.: Mitsubishi Engineering-Plastics Corporation, trade name: "PX100L"]

(C) Ingredient (C1)

High-impact polystyrene (HIPS) [manuf.: PS Japan Corporation, trade name: "HT478"]

Styrene-ethylene/butylene-styrene block copolymer (SEBS) [manuf.: KRATON Polymers Japan Ltd., trade name: "KRATON G1652"]

Styrene-ethylene/propylene-styrene block copolymer (SEPS) [manuf.: KURARAY CO., LTD., trade name: "SEPTON2004"]

Maleic-anhydride modified styrene-ethylene/butylene-styrene block copolymer (MAH-SEBS) [manuf.: KRATON Polymers Japan Ltd., trade name: "KRATON FG1901X"]

Epoxy group-containing styrene type thermoplastic elastomer (Epoxy-styrene type TPE) [manuf.: DAICEL CHEMICAL INDUSTRIES, LTD., trade name: "EPOFRIEND AT501]

Epoxy-modified polystyrene-graft-polystyrene (Epoxy/PS-g-PS) [manuf.: TOAGOSEI CO., LTD., trade name: "RESEDA GP-505"]

(C2)

Ethylene-glycidyl methacrylate copolymer-graft-polystyrene (EGMA-g-PS) [manuf.: NOF CORPORATION, trade name: "MODIPER A4100"]

Ethylene-ethyl acrylate-maleic anhydride copolymer-graft-acrylonitrile-styrene copolymer (E/EA/MAH-g-AS) [manuf.: NOF CORPORATION, trade name: "MODIPER A8400"]

Ethylene-glycidyl dimethacrylate-methyl acrylate copolymer (E/GMA-MA) [manuf.: Sumitomo Chemical Co. Ltd., trade name: "BONDFAST7L"]

Maleic-anhydride modified ethylene-vinyl acetate copolymer (MAH-EVA) [manuf.: DuPont-Mitsui Polychemicals Co., Ltd., trade name: "VR103"]

(C3)

Polycarbonate resin-graft-polystyrene (PC-g-PS) [manuf.: NOF CORPORATION, trade name: "MODIPER CL130D"]

(D) Ingredient

Triphenyl phosphate (Phosphoester <1>) [manuf.: DAIHACHI CHEMICAL INDUSTRY CO., LTD., trade name: "TPP"]

1,3-phenylenebis (a diphenyl phosphate) (Phosphoester <2>) [manuf.: DAIHACHI CHEMICAL INDUSTRY CO., LTD., trade name: "CR-733S"]

1,3-phenylenebis (a di 2,6-xylenyl phosphate) (Phosphoester <3>) [manuf.: DAIHACHI CHEMICAL INDUSTRY CO., LTD., trade name: "PX200"]

1,4-phenylenebis (a di 2,6-xylenyl phosphate) (Phosphoester <4>) [manuf.: DAIHACHI CHEMICAL INDUSTRY CO., LTD., trade name: "PX201"]

Other Ingredients

Polypropylene (PP) [manuf.: Japan Polypropylene Corporation, trade name: "NOVATEC BC3L"]

Ethylene-vinyl acetate copolymer (EVA) [manuf.: DuPont-Mitsui Polychemicals Co., Ltd., trade name: "EV360"]

Phenolic antioxidant [Manuf.: ADEKA CORPORATION, trade name: "AO-60"]

Sulfurous antioxidant [Manuf.: ADEKA CORPORATION, trade name: "AO412S"]

Phosphorous antioxidant [Manuf.: ADEKA CORPORATION, trade name: "PEP-36"]
Light stabilizer [Manuf.: ADEKA CORPORATION, tradename: "LA51"]
Copper inhibitor [Manuf.: ADEKA CORPORATION, tradename: "CDA-1"]

Preparation of Insulated Wire

Firstly, the respective ingredients shown in the below-described tables were kneaded with the use of a double-shaft extruder, and pellets of the compositions from which insulator layers to be included in insulated wires according to the present Examples and Comparative Examples were made were prepared.

Next, the obtained pellets were dried and then each of the compositions was covered in one layer around a conductor having the size of 0.35 mm$^2$ with the use of an extrusion molding machine, and thus the insulated wires according to the present Examples and Comparative Examples were prepared. The thicknesses of the insulator layers of the insulated wires were all arranged to be 0.25 mm.

In the thus-obtained insulated wires, the insulator layers were subjected to frost shattering and then were subjected to acetone extraction. The residues from the acetone extraction were subjected to toluene elution, and ingredients which were easily eluted with toluene were removed therefrom. The residues from the toluene elution were dissolved in hexafluoroisopropanol, and were separated into dissolved ingredients and undissolved ingredients. Then, methanol was added to the dissolved ingredients, and ingredients which were precipitated were dissolved with a benzyl alcohol and were filtered. The filtrates were subjected to titration using a benzyl alcohol of sodium hydroxide, and the densities of carboxyl groups were measured.

Test Procedure

Each of the insulated wires prepared as above was subjected to a flame-retardancy test, a water-resistance test and a wear-resistance test, and assessments of the insulated wires were made.

The assessments as to flame retardancy were made based on a "flame-retardancy test" in accordance with ISO 6722.

The assessments as to water resistance were made based on a "water-resistance test" in accordance with ISO 6722.

The assessments as to wear resistance were made as follows. First, the insulated wires were inserted into corrugated tubes, and were subjected to vibrations under conditions of a frequency of 30 Hz, an acceleration of 44.0 m/s$^2$, a temperature of 80° C., and a time of 240 hours. The insulated wire of which the covering material wore out but its conductor was not exposed was regarded as passed, and the insulated wire of which the covering material wore out and its conductor was exposed was regarded as failed.

Blending ratios of the ingredients of the compositions from which the insulator layers to be included in the insulated wires according to the present Examples and Comparative Examples are made, and assessment results of the insulated wires are shown in Tables 1 to 3 below.

TABLE 1

| | | | Example | | | | | | | |
|---|---|---|---|---|---|---|---|---|---|---|
| | | | 1 | 2 | 3 | 4 | 5 | 6 | 7 | 8 |
| (A) | | PBT<1> | 96 | 78 | — | 62 | 44 | 66 | — | 73 |
| | | PBT<2> | — | — | 67 | — | — | — | — | — |
| | | PBT<3> | — | — | — | — | — | — | 76 | — |
| | | PBT<4> | — | — | — | — | — | — | — | — |
| | | PET | — | — | — | — | — | — | — | — |
| (B) | | PPE<1> | 4 | 22 | 33 | — | 56 | — | 24 | 27 |
| | | PPE<2> | — | — | — | 38 | — | 34 | — | — |
| (C) | (C1) | HIPS | — | — | — | 12 | — | 6 | — | — |
| | | SEBS | — | — | — | 6 | — | — | — | — |
| | | SEPS | — | — | — | — | — | — | 12 | — |
| | | MAH-SEBS | 1 | — | — | — | 2 | 5 | — | 5 |
| | | Epoxy-styrene type TPE | — | — | 11 | — | 11 | — | 7 | — |
| | | Epoxy/PS-g-PS | — | — | — | — | — | — | — | — |
| | (C2) | EGMA-g-PS | — | 10 | — | 6 | — | — | — | — |
| | | E/EA/MAH-g-AS | — | — | — | — | — | — | — | — |
| | | E-GMA-MA | — | — | — | — | — | — | — | — |
| | | MAH-EVA | — | — | — | — | — | — | — | — |
| | (C3) | PC-g-PS | — | — | — | — | — | — | — | — |
| (D) | | Phosphoester <1> | — | — | — | — | 1 | — | 4 | — |
| | | Phosphoester <2> | — | — | — | — | — | 6 | — | — |
| | | Phosphoester <3> | 15 | — | 11 | — | — | — | 15 | 9 |
| | | Phosphoester <4> | — | 16 | — | 25 | — | — | — | — |
| Other ingredient | | PP | — | — | — | — | — | — | — | — |
| | | EVA | — | — | — | — | — | — | — | — |
| | | Phenolic antioxidant | 3 | 2 | 1.5 | 1 | 2 | 2 | 2 | 0.5 |
| | | Sulfurous antioxidant | — | 1 | — | — | — | 1 | — | 1 |
| | | Phosphorous antioxidant | 1 | 1 | 1 | 0.5 | — | — | 0.5 | — |
| | | Light stabilizer | — | — | 0.5 | — | — | — | — | — |
| | | Copper inhibitor | — | — | — | 0.5 | — | — | — | 0.5 |
| Concentration of carboxyl group (eq/10$^6$ g) | | | 25.3 | 22.1 | 35.5 | 22.1 | 18.7 | 29.6 | 38.4 | 26.5 |
| Assessment | | Flame retardancy | passed | passed | passed | passed | passed | passed | passed | passed |
| | | Water resistance | passed | passed | passed | passed | passed | passed | passed | passed |
| | | Wear resistance | passed | passed | passed | passed | passed | passed | passed | passed |

TABLE 2

|   |   | Example | | | | | | | |
|---|---|---|---|---|---|---|---|---|---|
|   |   | 9 | 10 | 11 | 12 | 13 | 14 | 15 | 16 |
| (A) | PBT<1> | 88 | 77 | 77 | 67 | — | 77 | — | 57 |
|   | PBT<2> | — | — | — | — | 64 | — | — | — |
|   | PBT<3> | — | — | — | — | — | — | 71 | — |
|   | PBT<4> | — | — | — | — | — | — | — | — |
|   | PET | — | — | — | — | — | — | — | 14 |
| (B) | PPE<1> | 12 | 23 | 23 | 33 | 36 | 23 | 29 | 29 |
|   | PPE<2> | — | — | — | — | — | — | — | — |
| (C) | (C1) HIPS | — | — | — | 20 | 20 | — | — | — |
|   | SEBS | — | — | — | — | — | — | — | 7 |
|   | SEPS | — | — | — | — | — | — | — | — |
|   | MAH-SEBS | 8 | — | 8 | 35 | 20 | — | 15 | — |
|   | Epoxy-styrene type TPE | — | 6 | — | — | — | 6 | — | 7 |
|   | Epoxy/PS-g-PS | — | 6 | — | — | — | — | — | — |
|   | (C2) EGMA-g-PS | — | — | — | — | — | — | — | — |
|   | E/EA/MAH-g-AS | 12 | — | — | — | — | — | — | — |
|   | E-GMA-MA | — | — | — | — | — | 6 | — | — |
|   | MAH-EVA | — | — | — | — | — | — | 6 | — |
|   | (C3) PC-g-PS | — | — | 3 | 15 | — | — | 4 | — |
| (D) | Phosphoester <1> | — | — | — | — | — | — | — | — |
|   | Phosphoester <2> | — | — | — | — | — | — | — | — |
|   | Phosphoester <3> | 6 | — | 8 | 23 | — | — | 6 | — |
|   | Phosphoester <4> | 6 | 6 | — | — | 50 | 9 | 5 | 11 |
| Other ingredient | PP | — | — | — | — | — | — | — | — |
|   | EVA | — | — | — | — | — | — | — | — |
|   | Phenolic antioxidant | 2 | 2 | 2 | 3 | 3 | 2 | 2 | 3 |
|   | Sulfurous antioxidant | 1 | 1 | — | 1 | — | — | — | — |
|   | Phosphorous antioxidant | 1 | 1 | — | — | — | 1 | — | 1 |
|   | Light stabilizer | — | — | — | — | — | 0.5 | — | — |
|   | Copper inhibitor | — | — | — | 1 | — | — | — | — |
| Concentration of carboxyl group (eq/$10^6$ g) | | 16.2 | 23.5 | 29.0 | 26.5 | 36.2 | 27.0 | 43.3 | 52.1 |
| Assessment | Flame retardancy | passed | passed | passed | passed | passed | passed | passed | passed |
|   | Water resistance | passed | passed | passed | passed | passed | passed | passed | passed |
|   | Wear resistance | passed | passed | passed | passed | passed | passed | passed | passed |

TABLE 3

|   |   | Comparative Example | | | | | | | | | |
|---|---|---|---|---|---|---|---|---|---|---|---|
|   |   | 1 | 2 | 3 | 4 | 5 | 6 | 7 | 8 | 9 | 10 |
| (A) | PBT<1> | 100 | 100 | — | 40 | 80 | 70 | 75 | — | 77 | 60 |
|   | PBT<2> | — | — | 50 | — | — | — | — | — | — | — |
|   | PBT<3> | — | — | — | — | — | — | — | — | — | — |
|   | PBT<4> | — | — | — | — | — | — | — | 78 | — | — |
|   | PET | — | — | — | — | — | — | — | — | — | — |
| (B) | PPE<1> | — | — | 50 | 60 | 20 | 30 | 25 | 22 | — | — |
|   | PPE<2> | — | — | — | — | — | — | — | — | 23 | 40 |
| (C) | (C1) HIPS | — | — | — | — | — | — | — | — | — | — |
|   | SEBS | — | — | — | — | 40 | — | — | — | — | — |
|   | SEPS | — | — | — | — | — | — | — | — | — | — |
|   | MAH-SEBS | — | 30 | 60 | 40 | 40 | — | — | — | — | — |
|   | Epoxy-styrene type TPE | — | — | — | — | — | — | — | — | 6 | — |
|   | Epoxy/PS-g-PS | — | — | — | — | — | — | — | 10 | — | — |
|   | (C2) EGMA-g-PS | — | — | 20 | — | — | — | — | — | 6 | 30 |
|   | E/EA/MAH-g-AS | — | — | — | — | — | — | — | — | — | — |
|   | E-GMA-MA | — | — | — | — | — | — | — | — | — | — |
|   | MAH-EVA | — | — | — | — | — | — | — | — | — | — |
|   | (C3) PC-g-PS | — | — | — | — | — | — | — | — | — | — |
| (D) | Phosphoester <1> | — | — | — | — | — | — | — | — | — | — |
|   | Phosphoester <2> | 5 | — | — | — | — | — | — | — | — | — |
|   | Phosphoestar <3> | — | 3 | 17 | 40 | — | 5 | 8 | 55 | — | — |
|   | Phosphoester <4> | — | — | — | — | 30 | — | — | — | — | 60 |
| Other ingredient | PP | — | — | — | — | — | — | 10 | — | — | — |
|   | EVA | — | — | — | — | — | — | 10 | — | — | — |
|   | Phenolic antioxidant | 2 | 2 | 1 | 2 | 1 | 1 | 1 | 2 | 2 | 2 |
|   | Sulfurous antioxidant | — | — | — | 1 | 0.5 | — | — | — | — | — |
|   | Phosphorous antioxidant | — | — | 0.5 | — | — | — | — | 0.5 | 0.5 | 0.5 |
|   | Light stabilizer | — | — | — | — | — | 0.5 | — | — | — | — |
|   | Copper inhibitor | — | — | — | — | — | — | — | — | — | — |
| Concentration of carboxyl group (eq/$10^6$ g) | | 27.6 | 30.1 | 40.5 | 32.2 | 29.0 | 25.4 | 21.2 | 63.8 | 19.8 | 21.0 |
| Assessment | Flame retardancy | failed | failed | passed | passed | passed | passed | passed | failed | passed | passed |
|   | Water resistance | passed | passed | passed | failed | passed | failed | failed | failed | passed | passed |
|   | Wear resistance | passed | passed | failed | failed | failed | failed | failed | failed | passed | failed |

According to Table 3, it was shown that the insulated wires according to the Comparative Examples gave results of "failed" in any of the assessment items of flame retardancy, water resistance and wear resistance.

To be specific, the insulated wire according to Comparative Example 1 contains the (A) ingredient out of the specified range (i.e., above the specified range) and does not contain the essential (B) and (C) ingredients at all, so that it does not satisfy flame retardancy.

The insulated wire according to Comparative Example 2 contains the (A) ingredient out of the specified range (i.e., above the specified range) and does not contain the essential (B) ingredient at all, so that it does not satisfy flame retardancy.

The insulated wire according to Comparative Example 3 contains the (C) ingredient out of the specified range (i.e., above the specified range), so that it does not satisfy wear resistance.

The insulated wire according to Comparative Example 4 contains the (A) ingredient out of the specified range (i.e., below the specified range), so that it does not satisfy wear resistance.

The insulated wire according to Comparative Example 5 contains the (C) ingredient out of the specified range (i.e., above the specified range), so that it does not satisfy wear resistance.

The insulated wire according to Comparative Example 6 does not contain the essential (C) ingredient at all, so that it does not satisfy water resistance or wear resistance.

The insulated wire according to Comparative Example 7 does not contain the essential (C) ingredient at all and instead another resin substitutes for the (C) ingredient, so that it does not satisfy water resistance or wear resistance.

The insulated wire according to Comparative Example 8 contains the (D) ingredient slightly out of the specified range (i.e., above the specified range); however, the concentration of a carboxyl group is particularly higher than the other insulated wires. When the concentration of the carboxyl group is higher, tendencies such as not to easily satisfy water resistance are shown.

The insulated wire according to Comparative Example 9 does not contain the essential (D) ingredient at all, so that it does not satisfy flame retardancy.

The insulated wire according to Comparative Example 10 contains the (D) ingredient out of the specified range (i.e., above the specified range), so that it does not satisfy wear resistance.

Meanwhile, according to Tables 1 and 2, the insulated wires according to the present Examples are found superior in all of flame retardancy, water resistance and wear resistance.

The invention claimed is:

1. An insulated wire including an insulator layer made from a composition, the composition comprising:
    (A) 96 to 44 parts by weight of a polyester type resin;
    (B) 4 to 56 parts by weight of a polyphenylene ether type resin;
    (C) 1 to 70 parts by weight of one or more than one sort of polymer selected from the group consisting of a styrene type polymer, an olefin type polymer including a functional group, and a polymer including an ester group with respect to 100 parts by weight of (A) the polyester type resin and (B) the polyphenylene ether type resin; and
    (D) 1 to 50 parts by weight of a phosphoester compound with respect to 100 parts by weight of (A) the polyester type resin and (B) the polyphenylene ether type resin.

2. The insulated wire according to claim 1, wherein a concentration of a carboxyl group which is contained in an ingredient dissolved in hexafluoroisopropanol is below 60eq/$10^6$g, the ingredient being obtained by subjecting the insulator layer to frost shattering and to acetone extraction, subjecting a residue from the acetone extraction to toluene elution and removing an ingredient which is easily eluted with toluene therefrom, and dissolving a residue from the toluene elution in the hexafluoroisopropanol.

3. The insulated wire according to claim 1, wherein the insulator layer is in an outermost layer.

4. The insulated wire according to claim 1, wherein the insulator layer has a thickness of less than 0.4 mm.

5. A wiring harness comprising the insulated wire according to claim 1.

* * * * *